(12) United States Patent
Matthews

(10) Patent No.: US 8,724,344 B2
(45) Date of Patent: *May 13, 2014

(54) METHOD AND APPARATUS FOR HIGH-SIDE INPUT WINDING REGULATION

(75) Inventor: David Michael Hugh Matthews, Windsor (GB)

(73) Assignee: Power Integrations, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/486,287

(22) Filed: Jun. 1, 2012

(65) Prior Publication Data

US 2012/0243266 A1 Sep. 27, 2012

Related U.S. Application Data

(63) Continuation of application No. 12/579,247, filed on Oct. 14, 2009, now Pat. No. 8,213,187.

(51) Int. Cl.
*H02M 3/335* (2006.01)

(52) U.S. Cl.
USPC .............................................. 363/16; 363/49

(58) Field of Classification Search
USPC ......... 363/16–20, 21.04, 21.07, 21.12, 21.13, 363/21.16, 49, 72, 80, 89, 131; 320/103, 320/107, 114, 127, 133, 145, 160, 158; 323/222, 282–285
See application file for complete search history.

(56) References Cited

U.S. PATENT DOCUMENTS

| | | | |
|---|---|---|---|
| 4,242,627 A | 12/1980 | Kisiel | |
| 4,382,221 A | 5/1983 | Reynolds | |
| 4,688,158 A * | 8/1987 | Peterson et al. | ........... 363/21.18 |
| 5,043,560 A * | 8/1991 | Masreliez | ..................... 219/497 |
| 5,140,229 A | 8/1992 | Yagi et al. | |
| 5,179,335 A | 1/1993 | Nor | |
| 5,305,192 A * | 4/1994 | Bonte et al. | ................ 363/21.16 |

(Continued)

FOREIGN PATENT DOCUMENTS

| | | |
|---|---|---|
| CN | 1564948 A | 1/2005 |
| CN | 101291112 A | 10/2008 |

OTHER PUBLICATIONS

"ST890—1.2 A Current Limited High Side Power Switch with Thermal Shutdown," © 2009 STMicroelectronics, Mar. 2009, Revision 8, pp. 1-20.

(Continued)

*Primary Examiner* — Rajnikant Patel
(74) *Attorney, Agent, or Firm* — Blakely Sokoloff Taylor & Zafman LLP

(57) ABSTRACT

A controller for use in a power converter includes a control circuit coupled to control switching of a power switch coupled between a positive input supply rail of the power converter and an energy transfer element input of the power converter. A sampling circuit is coupled to the control circuit and is coupled to receive a signal across the energy transfer element input during an off time of the power switch to provide a sampled output of the converter. The sampled output of the power converter is disabled from being resampled by the sampling circuit during an on time of the power switch. A switch conduction scheduling circuit is included in the control circuit and is coupled to the sampling circuit such that the control circuit is coupled to switch the power switch in response to the sampled output of the power converter.

11 Claims, 4 Drawing Sheets

(56) References Cited

U.S. PATENT DOCUMENTS

| | | | |
|---|---|---|---|
| 5,617,016 A * | 4/1997 | Borghi et al. ............. 323/284 |
| 5,963,015 A | 10/1999 | Lee |
| 6,226,190 B1 * | 5/2001 | Balakrishnan et al. .... 363/21.13 |
| 6,233,161 B1 | 5/2001 | Balakrishnan et al. |
| 6,275,018 B1 | 8/2001 | Telefus et al. |
| 6,370,039 B1 | 4/2002 | Telefus |
| 6,480,399 B2 | 11/2002 | Balakrishnan et al. |
| 6,633,475 B2 | 10/2003 | Thiele |
| 6,721,192 B1 | 4/2004 | Yang et al. |
| 6,853,563 B1 | 2/2005 | Yang et al. |
| 6,862,194 B2 | 3/2005 | Yang et al. |
| 6,862,198 B2 | 3/2005 | Muegge et al. |
| 7,193,865 B2 | 3/2007 | Balakrishnan et al. |
| 7,239,532 B1 | 7/2007 | Hsu et al. |
| 7,248,487 B1 | 7/2007 | Indika de Silva et al. |
| 7,259,972 B2 | 8/2007 | Yang |
| 7,301,319 B2 | 11/2007 | Balakrishnan et al. |
| 7,310,251 B2 | 12/2007 | Yang et al. |
| 7,342,812 B2 | 3/2008 | Piper et al. |
| 7,352,595 B2 | 4/2008 | Yang et al. |
| 7,362,592 B2 | 4/2008 | Yang et al. |
| 7,362,593 B2 | 4/2008 | Yang et al. |
| 7,492,613 B2 | 2/2009 | Yang et al. |
| RE40,656 E | 3/2009 | Yang et al. |
| 7,505,287 B1 | 3/2009 | Kesterson |
| 7,511,466 B2 | 3/2009 | Yang |
| 7,515,440 B2 | 4/2009 | Park |
| 7,561,447 B2 | 7/2009 | Yang et al. |
| 7,564,903 B2 | 7/2009 | Yang |
| 7,764,520 B2 * | 7/2010 | Djenguerian et al. ..... 363/21.13 |
| 2002/0067623 A1 | 6/2002 | Balakrishnan et al. |
| 2008/0246446 A1 | 10/2008 | Djenguerian et al. |
| 2012/0002448 A1 | 1/2012 | Djenguerian et al. |

OTHER PUBLICATIONS

CN 201010510576.4—First Chinese Office Action and Search Report, issued Nov. 27, 2012, with English Translation (16 pages).
CN 201010510576.4—Second Chinese Office Action, issued Jul. 18, 2013, with English Translation (14 pages).

* cited by examiner

| State | $I_{LIMIT}$ | $U_{FB}$ Low | $U_{FB}$ High |
|---|---|---|---|
| S1 | 100% | Enable 1 | Disable 1 |
| S2 | 100% | Enable 1 | Disable 2 |
| S3 | 90% | Enable 1 | Disable 1 |
| S4 | 90% | Enable 1 | Disable 2 |
| S5 | 80% | Enable 1 | Disable 1 |
| S6 | 80% | Enable 1 | Disable 2 |
| S7 | 70% | Enable 1 | Disable 1 |
| S8 | 70% | Enable 1 | Disable 2 |
| S9 | 70% | Enable 1 | Disable 4 |
| S10 | 70% | Enable 1 | Disable 8 |
| S11 | 70% | Enable 1 | Disable 16 |
| S12 | 70% | Enable 1 | Disable 32 |
| S13 | 70% | Enable 1 | Disable 64 |
| S14 | 70% | Enable 1 | Disable 128 |

FIG. 4

METHOD AND APPARATUS FOR HIGH-SIDE INPUT WINDING REGULATION

REFERENCE TO PRIOR APPLICATION(S)

This application is a continuation of U.S. application Ser. No. 12/579,247, filed Oct. 14, 2009, now pending. U.S. application Ser. No. 12/579,247 is hereby incorporated by reference.

BACKGROUND INFORMATION

1. Field of the Disclosure

The present invention relates generally to power supplies and, more specifically, the present invention relates to a switched mode power supply.

2. Background

Electronic devices use power to operate. Linear power supplies or adapters are widely used to power electronic products as well as charge batteries used to power mobile products such as for example wireless phones, palm top computers, toys, etc. due to their low cost. However, linear adapters typically include 50-60 Hz transformers, which result in linear power supplies that are very bulky and inefficient.

Switched mode power supplies are commonly used to bring the benefits of smaller size, weight, high efficiency and low power consumption at no load in many applications relative to linear power supplies. However, known switched mode power supplies are generally more expensive than their linear power supply counterparts at low power levels, for example below 5 watts, due to the relatively high number and cost of components and the complexity of circuitry. Consequently, linear power supplies are still commonly used in applications having power levels below 5 watts, even though the linear power supplies are bulky and inefficient. In cases where switched mode power supplies are used, there is a need to further reduce cost and component count to accelerate market adoption of switched mode power supplies in these applications.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

FIG. 4 shows an example of various states and respective parameters of a state machine included in a switch conduction scheduling circuit that implements a control technique in accordance with the teachings of the present invention.

DETAILED DESCRIPTION

Figure 1:
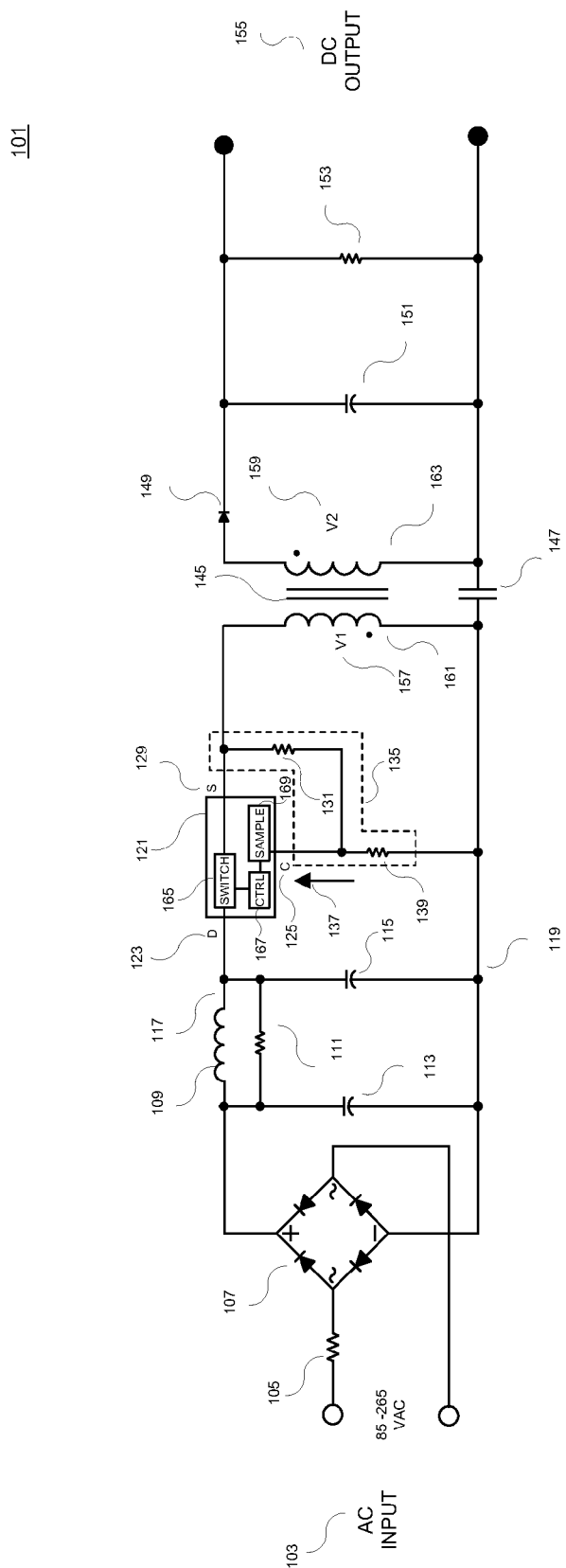
FIG. 1 is a schematic illustrating one example of a power supply including a power supply controller coupled to regulate an output of the power supply by sampling a reflected voltage from an energy transfer element input of the power supply during an off time of a power switch in accordance with the teachings of the present invention.

Methods and apparatuses for implementing a power supply control technique are disclosed. In the following description, numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment", "an embodiment", "one example" or "an example" means that a particular feature, structure or characteristic described in connection with the embodiment or example is included in at least one embodiment of the present invention. Thus, appearances of the phrases "in one embodiment", "in an embodiment", "one example" or "an example" in various places throughout this specification are not necessarily all referring to the same embodiment or example. Furthermore, the particular features, structures or characteristics may be combined in any suitable combinations and/or subcombinations in one or more embodiments or examples. Particular features, structures or characteristics may be included in an integrated circuit, an electronic circuit, a combinational logic circuit, or other suitable components that provide the described functionality. In addition, it is appreciated that the figures provided herewith are for explanation purposes to persons ordinarily skilled in the art and that the drawings are not necessarily drawn to scale.

As will be discussed, a power supply controller in accordance with the teachings of the present invention is positioned in the high-side or is coupled to a positive supply rail of a power converter. In one example, the power supply controller is coupled between an output of a rectification stage and a first terminal of an input or primary winding of an energy transfer element or transformer. In one example, the controller includes a power switch, which when switched on allows current to flow through the primary winding of the transformer. When the power switch turns off, the energy that has been stored in the magnetic circuit of the transformer during the power switch on time is delivered to an output or secondary winding of the transformer. In one example, this energy is stored in an output capacitance and delivered to a load coupled to the output of the power converter.

During the time that energy is delivered to the output of the power converter, the voltage across the primary winding of the transformer is approximately equal to the power converter output voltage multiplied by the turns ratio of the primary to secondary windings of the transformer. This voltage across the primary winding of the transformer during the time that energy is being delivered to the output of the power converter is referred to as the reflected voltage. Therefore, during the time when energy is being delivered to the output of the power converter, this voltage across the primary winding of the transformer can be used to sense what the power converter output voltage is.

In one example a resistor is coupled from a second terminal of the transformer primary winding to a terminal of the controller that is at a known voltage relative to the first terminal of the transformer primary winding. The current flowing in this resistor will therefore be an indication of the power converter output voltage during the time that energy is being delivered to the transformer secondary. The controller samples this current during the time when the energy is being delivered to the output of the power converter. This information can then be used to determine either how much energy to deliver to the primary winding the next time the power switch turns on, or whether to switch on the power switch at all, e.g., whether to skip a switching cycle.

In one example, a control technique of skipping cycles, also referred to as ON/OFF control, is used because it helps to eliminate losses associated with switching the power switch on and off when it is not necessary to deliver energy to the output of the power converter. This therefore improves the efficiency of the power converter, particularly under conditions where very little energy is demanded by a load connected to the output of the power converter. However, since it is necessary to periodically check what the power converter output voltage is in case, for example, the load conditions have changed suddenly, one example of the controller includes a state machine that gradually increases the number of skipped switching cycles as the load on the output is reduced. In one example, this is accomplished by using a sampled feedback signal as described above during the time that energy is being delivered to the output of the power converter following each power switch on period. This sampled feedback signal is then used in conjunction with information built up over a number of previous switching cycles to determine how many cycles to skip before again switching the power switch on. This technique provides a very simple feedback circuit, which in one example can be a single resistor coupled between the second terminal of the transformer primary winding and a feedback terminal of the controller.

Thus, in summary, an example power supply controller in accordance with the teachings of the present invention includes a high-side power switch that is coupled between a positive input supply rail and an energy transfer element input of a power supply, such as for example an input winding of a transformer. A sampling circuit is coupled to sample an output of the power supply, such as for example the voltage across an output winding of the transformer. In one example, the input and output windings of a transformer may also be referred to as the primary and secondary windings, respectively.

In one example, the sampling circuit obtains the sampled output of the power supply by sampling a reflected voltage across the energy transfer element input during an off time of the power switch. In one example, the reflected voltage across the energy transfer element input is representative of the output of the power supply during the off time of the power switch following an on time of the power switch while a diode coupled to the output winding conducts current. The sampled output of the power supply is disabled from being resampled during the on time of the power switch. In one example, the power supply controller includes a control circuit that is coupled to the sampling circuit and the power switch. The control circuit is coupled to switch the power switch in response to the sampled output of the power supply according to a control scheme in accordance with the teachings of the present invention to regulate the power supply output.

To illustrate, FIG. 1 is a schematic illustrating one example of a power supply 101 including a power supply controller 121 coupled to regulate an output of the power supply in accordance with the teachings of the present invention. As shown in the depicted example, power supply 101 is a flyback converter that includes an ac input 103 and a dc output 155. A rectifier 107 is coupled to ac input 103 through a resistor 105. In one example, resistor 105 is a fusible resistor that is used for fault protection in place of a fuse for lower cost. In another example, a fuse or the like may be used in place of resistor 105. Rectifier 107 converts an ac signal from ac input 103 to a dc signal, which is then filtered in one example by capacitors 113 and 115, which are coupled as shown across rectifier 107. In one example, an inductor 109 is coupled between capacitors 113 and 115 such that a π filter is formed to filter electromagnetic interference (EMI) generated by power supply 101. A resistor 111 is coupled across inductor 109 between capacitors 113 and 115 in one example to damp inductor resonance from inductor 109, which can cause peaks in the EMI spectrum.

As mentioned, a low frequency (e.g. 50 Hz or 60 Hz mains frequency), high voltage ac signal is received in one example at ac input 103 and is converted to high voltage dc with rectifier 107 and capacitors 113 and 115. Thus, a positive input supply rail 117 and negative input supply rail 119 are provided at opposite ends of capacitor 115. The voltage between positive input supply rail 117 and negative input supply rail 119 is applied to an energy transfer element 145, such as for example a transformer, to transform the voltage, usually to a lower voltage, and to usually provide safety isolation. The output of the energy transfer element 145 is rectified to provide a regulated dc output at dc output 155, which may be used to power an electronic device. In the depicted example, energy transfer element 145 is a transformer or coupled inductors having an input winding 161 magnetically coupled to an output winding 163. In one example, energy transfer element 145 and capacitor 147 are coupled between ac input 103 and dc output 155 as shown in FIG. 1 to provide electrical isolation between ac input 103 and dc output 155.

As shown in the depicted example, power supply controller 121 includes a power switch 165 coupled between first and second terminals 123 and 129, which are coupled between positive input supply rail 117 and input winding 161 of energy transfer element 145. Power supply controller 121 also includes a sampling circuit 169 and a control circuit 167, which are coupled to control power switch 165 in accordance with the teachings of the present invention.

In operation, energy is transferred to secondary winding 163 from the input winding 161 in a manner controlled by the power supply regulator 121. When the power switch 165 within power supply controller 121 is on, input supply rail 117 is coupled to input winding 161 and current ramps up in input winding 161. When the power switch 165 within power supply regulator 121 is turned off, the current flow through input winding 161 is interrupted, which forces the voltages V1 157 across input winding 161 and V2 159 on secondary winding 163 to reverse polarity. The reversal of voltages in V1 157 and V2 159 when the power switch 165 is off allows diode 149 to conduct current, which enables the delivery of energy stored in the energy transfer element 145 to capacitor 151 and load 153 across dc output 155.

In the illustrated example, the voltage V1 157 across input winding 161 is a reflected voltage of the voltage V2 159 across output winding 163 during an off time of power switch 165 while diode 149 coupled to output winding 163 conducts current. Specifically, the voltage V1 157 across input winding 161 during the off time of power switch 165 while diode 145 conducts current is a reflected voltage that is representative of the voltage V2 159 across output winding 163 according to the turns ratio of energy transfer element 145. In contrast, the voltage V1 157 across input winding 161 during an on time of power switch 165 is representative of an input voltage present between the positive and negative input rails 117 and 119.

As shown in the example depicted in FIG. 1, power supply 101 includes a resistor 139 coupled between terminal 125 of power supply controller 121 and input winding 161. In one example, terminal 125 is coupled sampling circuit 169 to sense a signal 137 from input winding 161 during an off time of the power switch 165 while diode 149 conducts current to provide a sampled output of the power supply.

In one example, optional resistor 131 is not included between resistor 139 and input winding 161 as shown in FIG. 1. In this example, signal 137 is a current signal that is representative of the reflected voltage V1 157 across input winding 161. In this example, terminal 125 is a low impedance terminal through which sampling circuit 169 is coupled to sense the current of signal 137 to sample reflected voltage V1 157 during an off time of the power switch to provide a sampled output of the power supply in accordance with the teachings of the present invention. In one example, the control circuit 167 of power supply controller 121 is coupled to switch power switch 165 in response to the sampled output of the power supply to regulate the dc output 155 of the power supply. In the example, the sampled output of the power supply is disabled from being resampled during an on time of the power switch. However, in one example, sampling circuit 169 may be coupled to sample through terminal 125 a signal representative of the input voltage of the power supply during an on time of the power switch 165 to provide a sampled input of the power supply in accordance with the teachings of the present invention. In one example the signal representative of the input voltage of the power supply during an on time of the power switch 165 is a current flowing in resistor 139 during the on time of power switch 165 in accordance with the teachings of the present invention.

In another example, optional resistor 131 is included between resistor 139 and input winding 161 to form a resistor divider 135 coupled across input winding 151 as shown in the example depicted in FIG. 1. In this example, signal 137 is a voltage signal received through resistor divider 135. In one example, this voltage signal 137 is a voltage substantially equal to a voltage between terminal 125 and terminal 129 of controller 121. In the example, signal 137 is representative of the reflected voltage V1 157 across input winding 161. In this example, terminal 125 is a high impedance terminal through which sampling circuit 169 is coupled to sense the voltage of signal 137 to sample reflected voltage V1 157 during an off time of the power switch to provide a sampled output of the power supply in accordance with the teachings of the present invention. In one example, the control circuit 167 of power supply controller 121 is coupled to switch power switch 165 in response to the sampled output of the power supply to regulate the dc output 155 of the power supply. In the example, the sampled output of the power supply is disabled from being resampled during an on time of the power switch. However, in one example, sampling circuit 169 may be coupled to sample through terminal 125 a signal representative of the input voltage of the power supply during an on time of the power switch 165 to provide a sampled input of the power supply in accordance with the teachings of the present invention. In one example the signal representative of the input voltage of the power supply during an on time of the power switch 165 is a current flowing in terminal 125 during the on time of power switch 165 in accordance with the teachings of the present invention.

Therefore, examples of power supply controller 121 coupled to the high-side of the input winding 161 in accordance with the teachings of the present invention as shown regulate the dc output 155 of power supply 101 by sampling the reflected voltage V1 157 across primary winding 161 to obtain a sampled output of the power supply during an off time of the power switch 165 and disabled from resampling the sampled output during an on time of the power switch. It is appreciated that by regulating the reflected voltage V1 157 across input winding 161 as discussed, the output voltage V2 159 is regulated in accordance with the teachings of the present invention.

It is also appreciated that in the illustrated examples, output voltage V2 159 is regulated by power supply controller 121 without the use of feedback circuitry coupled to dc output 155. Indeed, known flyback power converters often utilize circuitry such as opto-couplers or a separate feedback winding to provide feedback information. Thus, the component count of the presently described power supply 101 is reduced compared to known switched mode power supplies.

In one example, the turns ratio of the transformer of energy transfer element 145 is designed to accommodate an output short circuit current condition in accordance with an internal current limit of the power switch of the power supply regulator 121. In one example, a constant output current/constant output voltage characteristic is provided at DC output 155 by power supply 101 for applications such as for example battery charging. In the illustrated example, power supply 101 includes a resistor 153 coupled across DC output 155 to provide a minimum load to improve load regulation at no load.

Figure 2:
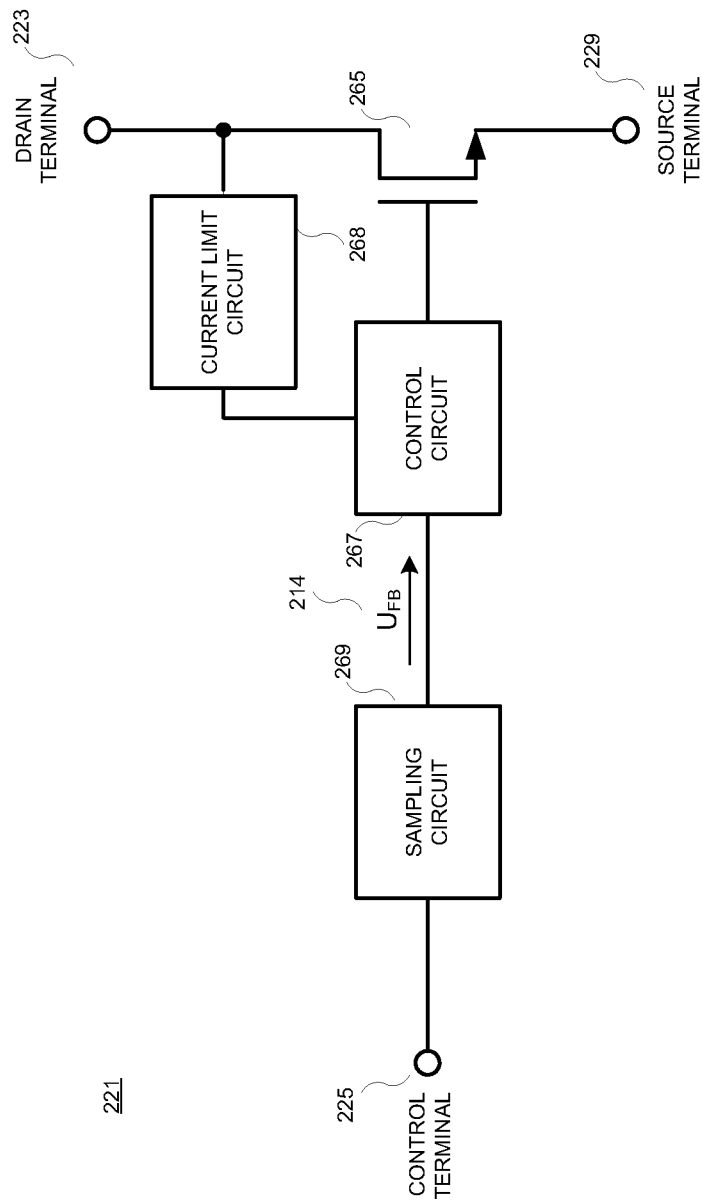
FIG. 2 is a block diagram illustrating one example of a power supply controller to regulate an output of a power supply by sampling a reflected voltage from an energy transfer element input of the power supply during an off time of a power switch in accordance with the teachings of the present invention.

FIG. 2 is a block diagram illustrating one example of a power supply controller 221 to regulate an output of a power supply by sampling a reflected voltage from an energy transfer element input of the power supply during an off time of a power switch in accordance with the teachings of the present invention. In one example, power supply controller 221 is one example of a controller that may be used in place of power supply controller 121 of FIG. 1. In one example, power supply controller 221 is included on a single monolithic chip having as few as three electrical terminals. As illustrated in FIG. 2, power supply controller 221 includes a power switch 265 coupled between electrical terminals 223 and 229. In one example, power switch 265 is a metal oxide semiconductor field effect transistor (MOSFET). In one example, power switch 265 includes an n-channel MOSFET having a drain coupled to terminal 223 and a source coupled to terminal 229. In one example, terminal 223 is to be coupled to a positive input supply rail and terminal 229 is to be coupled to an energy transfer element input of a power supply.

As shown in the example depicted, power supply controller 221 also includes a sampling circuit 269 coupled to receive a signal through control terminal 225. In one example, sampling circuit 269 is coupled to receive a current through control terminal 225 that is responsive to a reflected voltage from an energy transfer element of a power supply that power supply controller 221 is coupled to regulate. In another example, sampling circuit 269 is coupled to receive a voltage at control terminal 225 relative to terminal 229 that is responsive to a reflected voltage from an energy transfer element of a power supply that power supply controller 221 is coupled to regulated.

In the depicted example, sampling circuit 269 is coupled to sample the signal received through control terminal 225 to sample a signal across the energy transfer element input of the power supply during an off time of the power switch to 265 provide a sampled output $U_{FB}$ 214 of the power supply. In the examples, the sampled output of the power supply is disabled from being resampled by the sampling circuit during an on time of the power switch 265. In one example, control circuit 267 is coupled to sampling circuit to receive sampled output $U_{FB}$ 214. In the example, control circuit 267 is also coupled to power switch 265 to switch power switch 265 in response to the sampled output $U_{FB}$ 214 of the power supply.

In one example, power supply controller 221 also includes a current limit circuit 268 coupled to power switch 265 and control circuit 267. In one example, the current limit circuit 268 is coupled to provide a current limit signal to control circuit 267 to limit the current through the power switch 265. In one example, current limit circuit 268 senses the current that flows through power switch 265 when turned on by monitoring the drain to source voltage of power switch 265. In one example, the on resistance of power switch 265 is used as a current sense resistor. In one example, when the current that flows through power switch 265 reaches the current limit, control circuit 267 adjusts the switching of power switch 265 accordingly such that that the current that flows through power switch 265 does not exceed the current limit. In one example, the current limit of the power switch 265 that is determined by current limit circuit 268 is adjusted in response to the sampled output of the power supply as sampled through control terminal 225.

In another example, power switch 265 is optionally a discrete switch that is separate from the chip of power supply controller 221. In this example, power supply controller 221 includes sampling circuit 269, controller circuit 267 and current limit circuit 268.

Figure 3:
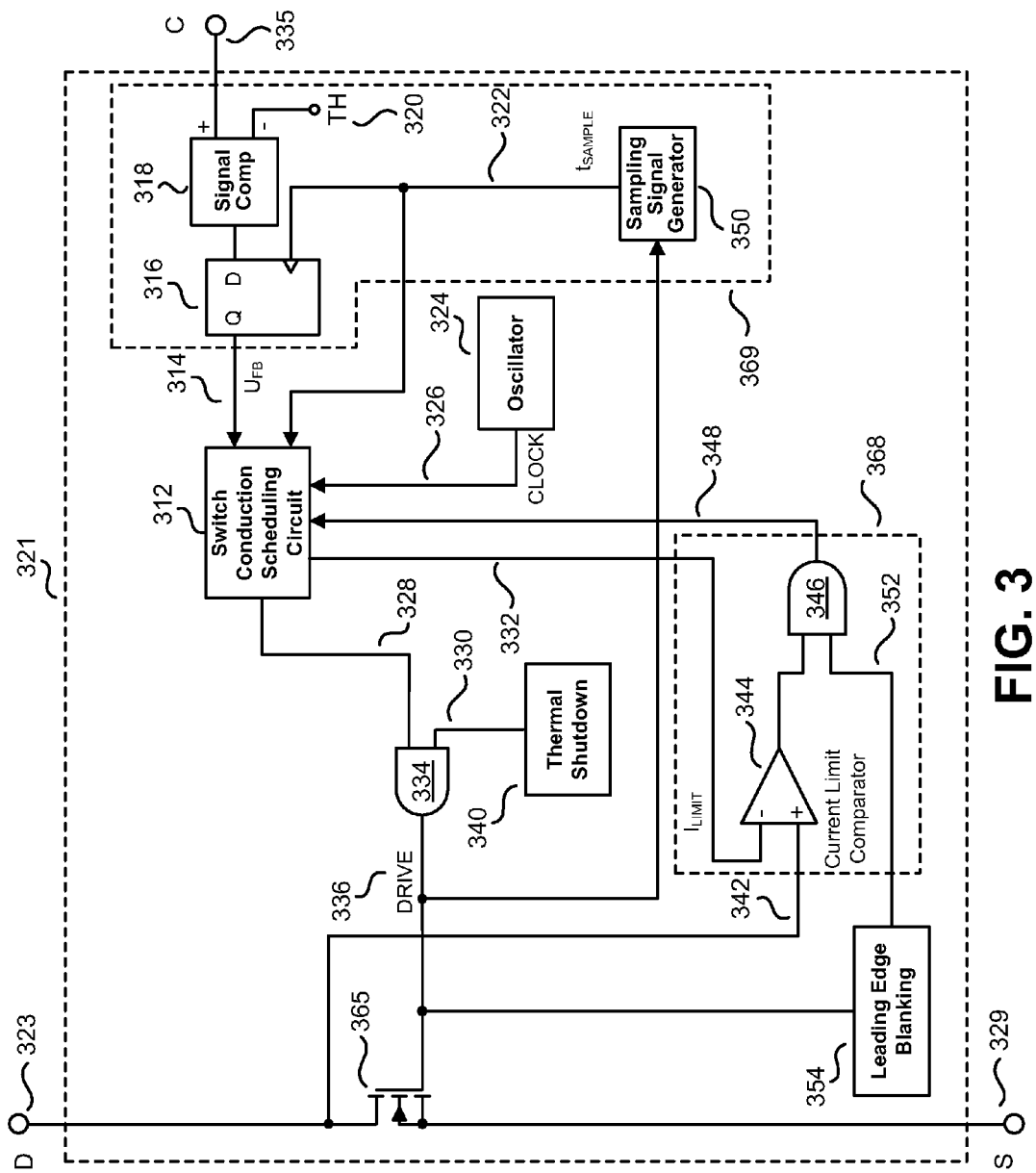
FIG. 3 is a diagram illustrating internal details of an example power supply controller that implements a control technique to regulate an output of a power supply by sampling a reflected voltage from an energy transfer element input of the power supply during an off time of a power switch in accordance with the teachings of the present invention.

FIG. 3 is a diagram illustrating internal details of an example power supply controller 321 that implements a control technique to regulate an output of a power supply by sampling a reflected voltage from an energy transfer element input of the power supply during an off time of a power switch in accordance with the teachings of the present invention. In one example, power supply controller 321 is one example of a controller that may be used in place of power supply controller 121 of FIG. 1 or power supply controller 221 of FIG. 2. In one example, power supply controller 321 is included on a single monolithic chip having as few as three electrical terminals.

As shown in the depicted example, a power switch 365 switches current between the drain terminal 323 and the source terminal 329 in response to a drive signal 336 from an AND gate 334. In one example, power switch 365 includes a power MOSFET. In one example, a switch conduction scheduling circuit 312 is also included and generates an output signal 328 that is coupled to be received by AND gate 334. In one example, switch conduction scheduling circuit 312 includes a states machine and uses ordinary digital circuits such as for example logic gates, flip-flops, latches, counters, and the like, to produce outputs and schedule future switching cycles of power switch 365.

As will be discussed, in one example, switch conduction scheduling circuit is coupled to disable the power switch 365 from being switched for one or more consecutive clock cycles of the power supply controller 321 in response to the sampled output of the power supply in accordance with the teachings of the present invention. In one example, switch conduction scheduling circuit is coupled to enable the power switch 365 to be switched during a next clock cycle of the power supply controller 321 in response to the sampled output of the power supply in accordance with the teachings of the present invention Referring back to the example depicted in FIG. 3, AND gate 334 is coupled to receive a thermal shutdown signal 330 from an optional thermal shutdown circuit 340. In the example, the drive signal 336 from the output of AND gate 334 goes low to turn off power switch 365 whenever the thermal shutdown signal 330 goes low. The thermal shutdown circuit 340 causes the thermal shutdown signal 330 to go low when a temperature of the integrated circuit exceeds a threshold temperature value. Thus, the thermal shutdown circuit 340 causes the power switch 338 to turn off when the temperature of the integrated circuit is too high.

As shown in the depicted example, an oscillator 324 provides a clock signal 326 to the switch conduction scheduling circuit 312. In one example, clock signal 326 is used to determine both the start of each switching cycle and the maximum time the power switch 365 may be turned on in each switching cycle. As will be understood, oscillator 324 in other examples could optionally provide separate signals to determine the initiation of a switching cycle and the maximum on time for power switch 365. In one example, the duration of each switching cycle is approximately 15 microseconds.

In one example, a sampling circuit 369 is included in power supply controller 321. In one example, sampling circuit 369 includes a latch 316 coupled to a signal comparator 318 and a sampling signal generator 350. In the illustrated example, signal comparator 318 is coupled to compare a sense signal received through control terminal 335 with a threshold value TH 320. In one example, the sense signal and the threshold value TH 320 are current signals. In this example, signal comparator 318 includes a current comparator. In another example, the sense signal and the threshold value TH 320 are voltage signals. In this example, signal comparator 318 includes a voltage comparator. In the examples, the sense signal received through terminal 335 is representative of a voltage across the output of the power supply during an off time of the power switch 365. In the examples, signal comparator 318 is coupled to indicate when the sense signal is greater than the threshold value TH 320 or less than threshold value TH 320 to determine when the sampled output of the power is greater or less than a threshold value.

As shown in the example, latch 316 is coupled to sample the output of signal comparator 318 to produce a sampled output signal $U_{FB}$ 314 at a sampling time determined by a sampling signal $t_{sample}$ 322. In one example, the sample feedback signal $U_{FB}$ 314 is the sampled output of the power supply in accordance with the teachings of the present invention.

As shown in the depicted example, sampling signal $t_{sample}$ 322 is generated by the sampling signal generator 350 in response to drive signal 336. The sampling time of sampling signal $t_{sample}$ 322 is determined by the time the power switch 365 turns off, delayed by a sample delay time. In one example, drive signal 336 is coupled to disable the sampling signal generator 350 from causing latch 316 to resample $U_{FB}$ 314 during an on time of the power switch 365. In one example, drive signal 336 is coupled to enable the sampling signal generator 350 to cause latch 316 to resample $U_{FB}$ 314 only during an off time of the power switch 365.

In one example, sampling signal generator 350 receives the drive signal 336 and delays the drive signal 336 by the sample delay time to generate the sampling signal $t_{sample}$ 322 after a delay following a falling edge of the drive signal 336. In one example, the sample delay time is 2.5 microseconds. Thus, in this example, the output of signal comparator 318 is sampled by latch 316 2.5 microseconds after the falling edge of drive signal 336, which is during an off time of power switch 365 2.5 microseconds after an on time. At this time, it is assumed that a diode coupled to an output winding of the power supply is still conducting current such that latch 316 is able to latch the signal across the energy transfer element input of the power supply during the off time of the power switch. In one example, the sampled output of the power supply is disabled from being resampled during an on time of power switch 365 in accordance with the teachings of the present invention.

In other examples the period of time following a falling edge of the drive signal 336 that the output of signal comparator 318 is sampled by latch 316 can be a variable time based on factors such as the peak current flowing in switch 365 during the on time of switch 365 or depending on the state of the switch conduction scheduling circuit 312. In yet other examples the period of time following a falling edge of the drive signal 336 that the output of signal comparator 318 is sampled by latch 316 can be a variable time based on a change in the magnitude of the signal received at terminal 335, which in one example can be used as an indication that an output diode, diode 149 in FIG. 1 for example, has ceased conducting current.

As shown in the depicted example, a current limit circuit 368 is also included in power supply controller 321. In one example, current limit circuit 368 includes a current limit comparator 344 coupled to an AND gate 346. In one example, current limit comparator compares a signal 342, which is proportional to the current through the power switch 365, with a current limit reference $I_{LIMIT}$ 332 received from the switch conduction scheduling circuit 312. In one example, the current limit reference $I_{LIMIT}$ 332 is based on a current state S of the switch conduction scheduling circuit 312.

In operation, one example of the output of the current limit comparator 344 goes high to indicate when the current through power switch 365 reaches the current limit reference value $I_{LIMIT}$ 332 as determined by switch conduction scheduling circuit 312. Drive signal 336 is delayed by a leading edge blanking circuit 354 before being applied to the input 352 of AND gate 346 to prevent the current limit input 348 to the switch conduction scheduling circuit 312 from indicating a false current limit condition when power switch 365 momentarily discharges stray capacitance as it turns on. In response to current limit input 348 indicating that the current in power switch 365 has reached the current limit reference value $I_{LIMIT}$ 332, switch conduction scheduling circuit 312 instructs the power switch 365 to terminate its conduction through operation of signal 328 and AND gate 334.

As shown in the illustrated example, the switch conduction scheduling circuit 312 includes two outputs. A first output 328 of switch conduction scheduling circuit 312 is gated by AND gate 334 to generate the drive signal 336 to turn the power switch 365 on and off. A second output 332 of conduction scheduling circuit 312 sets the reference of the current limit $I_{LIMIT}$ 332 received by current limit comparator 344. Thus, one example the switch conduction scheduling circuit 312 enables or disables the power switch 365 from conducting in each switching cycle, controls the termination of conduction during an enabled cycle, and also sets the current limit at which the power limit 365 turns off after it is enabled in accordance with the teachings of the present invention.

To illustrate, FIG. 4 shows an example of various states and respective parameters of a state machine included in a switch conduction scheduling circuit that implements a control technique in accordance with the teachings of the present invention. As shown in the one example illustrated in FIG. 4, a plurality of states S1 through S14 may be included in the state machine of the switch conduction scheduling circuit. In one example, the state machine described in FIG. 4 is one example of a state machine that may be included in a switch conduction scheduling circuit that may be used in place of switch conduction scheduling circuit 312 of FIG. 3. In one example, the state machine will transition from one state to a next or previous state in response to a predetermined number (e.g., 3 or 7) consecutive number of low or high values of the sampled output of the power supply $U_{FB}$.

As described in the depicted example, when the state machine is operating in state S1, the current limit $I_{LIMIT}$ is set to 100% of a predetermined current limit. If the sampled output of the power supply $U_{FB}$ is low, then the next switching cycle of the power switch is enabled for the next clock cycle. If the sampled output of the power supply $U_{FB}$ is high, then the next switching cycle of the power switch is disabled for the next clock cycle. It is noted that when the sampled output of the power supply $U_{FB}$ is low, the sampled output of the power supply is less than a threshold value. When the sampled output of the power supply $U_{FB}$ is high, the sampled output of the power supply is greater than the threshold value.

When the state machine is operating in state S2, the current limit $I_{LIMIT}$ is set to 100% of the predetermined current limit. If the sampled output of the power supply $U_{FB}$ is low, then the next switching cycle of the power switch is enabled for the next clock cycle. If the sampled output of the power supply $U_{FB}$ is high, then the next two switching cycles of the power switch are disabled for the next two consecutive clock cycles.

When the state machine is operating in state S3, the current limit $I_{LIMIT}$ is set to 90% of the predetermined current limit. If the sampled output of the power supply $U_{FB}$ is low, then the next switching cycle of the power switch is enabled for the next clock cycle. If the sampled output of the power supply $U_{FB}$ is high, then the next switching cycle of the power switch is disabled for the next clock cycle.

When the state machine is operating in state S4, the current limit $I_{LIMIT}$ is set to 90% of the predetermined current limit. If the sampled output of the power supply $U_{FB}$ is low, then the next switching cycle of the power switch is enabled for the next clock cycle. If the sampled output of the power supply $U_{FB}$ is high, then the next two switching cycles of the power switch are disabled for the next two consecutive clock cycles.

When the state machine is operating in state S5, the current limit $I_{LIMIT}$ is set to 80% of the predetermined current limit. If the sampled output of the power supply $U_{FB}$ is low, then the next switching cycle of the power switch is enabled for the next clock cycle. If the sampled output of the power supply $U_{FB}$ is high, then the next switching cycle of the power switch is disabled for the next clock cycle.

When the state machine is operating in state S6, the current limit $I_{LIMIT}$ is set to 80% of the predetermined current limit. If the sampled output of the power supply $U_{FB}$ is low, then the next switching cycle of the power switch is enabled for the next clock cycle. If the sampled output of the power supply $U_{FB}$ is high, then the next two switching cycles of the power switch are disabled for the next two consecutive clock cycles.

When the state machine is operating in state S7, the current limit $I_{LIMIT}$ is set to 70% of the predetermined current limit. If the sampled output of the power supply $U_{FB}$ is low, then the next switching cycle of the power switch is enabled for the next clock cycle. If the sampled output of the power supply $U_{FB}$ is high, then the next switching cycle of the power switch is disabled for the next clock cycle.

When the state machine is operating in states S8, S9, S10, S11, S12, S13 or S14, the current limit $I_{LIMIT}$ is set to 70% of the predetermined current limit. If the sampled output of the power supply $U_{FB}$ is low, then the next switching cycle of the power switch is enabled for the next clock cycle. If the sampled output of the power supply $U_{FB}$ is high when the state machine is operating in states S8, S9, S10, S11, S12, S13 or S14, then the next 2, 4, 8, 16, 32, 64 or 128 switching cycles, respectively, of the power switch are disabled for the next 2, 4, 8, 16, 32, 64 or 128 consecutive clock cycles, respectively.

It is therefore appreciated that in one example, when the sampled output of the power supply is greater than the threshold value, the switch conduction scheduling circuit is coupled to disable the power switch from being switched for one or more subsequent consecutive clock cycles in response to the sampled output of the power supply being greater than the threshold value. However, when the sampled output of the power supply is less than the threshold value, the switch conduction scheduling circuit coupled to enable the power switch to be switched during a next clock cycle in response to the sampled output of the power supply being less than a threshold value. It is also appreciated in the described example that in all of states S1 through S14 of this example, at least one enabled cycle immediately follows the predetermined number of disabled cycles.

It is appreciated that the low and high logical values can be easily reversed with appropriate logical inversions in the circuit. The number of subsequent switching cycles that are disabled cycles depends on each particular state. In the example described in FIG. 4, it is observed that starting at state S7, when the current limit $I_{LIMIT}$ is at its lowest setting of 70%, the number of disabled cycles is increased in binary powers, doubling from one disabled cycle in state S7 to two disabled cycles in S8 and continuing to 128 disabled cycles in the highest state S14. It is appreciated that the increase of disabled cycles in binary powers is a matter of convenience in this example and other examples may use different schedules for future disabled cycles. It is appreciated that in other examples, the various states of the state machine could select different percentage setting for the current limit $I_{LIMIT}$ where for example the lowest current limit could be 40% or less instead of 70% of the example given in FIG. 4.

The above description of illustrated examples of the present invention, including what is described in the Abstract, are not intended to be exhaustive or to be limitation to the precise forms disclosed. While specific embodiments of, and examples for, the invention are described herein for illustrative purposes, various equivalent modifications are possible without departing from the broader spirit and scope of the present invention. Indeed, it is appreciated that the specific voltages, currents, frequencies, power range values, times, etc., are provided for explanation purposes and that other values may also be employed in other embodiments and examples in accordance with the teachings of the present invention.

These modifications can be made to examples of the invention in light of the above detailed description. The terms used in the following claims should not be construed to limit the invention to the specific embodiments disclosed in the specification and the claims. Rather, the scope is to be determined entirely by the following claims, which are to be construed in accordance with established doctrines of claim interpretation. The present specification and figures are accordingly to be regarded as illustrative rather than restrictive.

What is claimed is:

1. A controller for use in a power converter, comprising:
    a control circuit coupled to control switching of a power switch coupled between a positive input supply rail of the power converter and an energy transfer element input of the power converter;
    a sampling circuit coupled to the control circuit and coupled to receive a signal across the energy transfer element input of the power converter during an off time of the power switch to provide a sampled output of the converter, wherein the sampled output of the power converter is disabled from being resampled by the sampling circuit during an on time of the power switch; and
    a switch conduction scheduling circuit included in the control circuit and coupled to the sampling circuit such that the control circuit is coupled to switch the power switch in response to the sampled output of the power converter.

2. The controller of claim 1 wherein the sampling circuit includes a signal comparator coupled to receive the signal across the energy transfer element input of the power converter as a current through a resistor coupled to the input of the energy transfer element input of the power converter.

3. The controller of claim 1 wherein the sampling circuit includes a signal comparator coupled to receive the signal across the energy transfer element input of the power converter as a voltage from a resistor divider coupled across the input of the energy transfer element input of the power converter.

4. The controller of claim 1 wherein the energy transfer element comprises a primary winding of a transformer coupled to the energy transfer element input.

5. The controller of claim 1 wherein the switch conduction scheduling circuit is coupled to disable the power switch from being switched for one or more consecutive clock cycles of the controller in response to the sampled output of the power converter being greater than a threshold value.

6. The controller of claim 1 wherein the switch conduction scheduling circuit is coupled to enable the power switch to be switched during a next clock cycle of the controller in response to the sampled output of the power converter being less than a threshold value.

7. The controller of claim 1 wherein the sampling circuit comprises a latch coupled to latch the signal across the energy transfer element input of the power converter during the off time of the power switch in response to the control circuit.

8. The controller of claim 1 wherein the signal across the energy transfer element input of the power supply during the off time of the power switch is representative of an output voltage of the power supply.

9. The controller of claim 1 wherein the signal across the energy transfer element input of the power supply during an on time of the power switch is representative of an input voltage of the power supply.

10. The controller of claim 9 wherein the sampling circuit is coupled to sample the signal across the energy transfer element input of the power supply during the on time of the power switch to provide a sampled input of the power supply.

11. The controller of claim 1 further comprising a current limit circuit coupled to the power switch and the control circuit, the current limit circuit coupled to limit a current through the power switch.

* * * * *